United States Patent
Campbell et al.

(10) Patent No.: US 7,025,474 B2
(45) Date of Patent: Apr. 11, 2006

(54) DUAL MODE DISPLAY WITH A BACKLIGHT FILTER FOR AN UNACTIVATED LIGHT EMITTING DIODE (LED)

(75) Inventors: William T. Campbell, Albuquerque, NM (US); Randy M. Maner, Albuquerque, NM (US); Steven A. Grossman, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 134 days.

(21) Appl. No.: 10/700,928

(22) Filed: Nov. 3, 2003

(65) Prior Publication Data

US 2005/0094391 A1    May 5, 2005

(51) Int. Cl.
*F21V 9/00* (2006.01)
(52) U.S. Cl. .................. 362/231; 362/293
(58) Field of Classification Search .......... 362/293, 362/227–252; 349/68
See application file for complete search history.

(56) References Cited

U.S. PATENT DOCUMENTS

| | | | | |
|---|---|---|---|---|
| 4,722,028 A | * | 1/1988 | Brannon et al. | 362/29 |
| 4,934,793 A | * | 6/1990 | Klein | 349/67 |
| 5,143,433 A | * | 9/1992 | Farrell | 362/29 |
| 5,262,880 A | * | 11/1993 | Abileah | 349/64 |
| 5,479,275 A | * | 12/1995 | Abileah | 349/5 |
| 5,982,090 A | | 11/1999 | Kalmanash | |
| 5,986,730 A | | 11/1999 | Hansen et al. | |
| 6,039,451 A | | 3/2000 | Grave | |
| 6,111,622 A | * | 8/2000 | Abileah | 349/61 |
| 6,285,425 B1 | | 9/2001 | Akins et al. | |
| 6,285,426 B1 | | 9/2001 | Akins et al. | |
| 6,419,372 B1 | | 7/2002 | Shaw et al. | |
| 6,758,586 B1 | * | 7/2004 | Wilhem et al. | 362/471 |
| 6,789,921 B1 | * | 9/2004 | Deloy et al. | 362/252 |
| 6,842,204 B1 | * | 1/2005 | Johnson | 349/74 |
| 2003/0012035 A1 | | 1/2003 | Bernard | |

FOREIGN PATENT DOCUMENTS

EP    0 615 151 A    9/1994
FR    2 820 235 A1    8/2002

OTHER PUBLICATIONS

International Search Report PCT/US2004/036514, Feb. 14, 2005.

* cited by examiner

*Primary Examiner*—Alan Cariaso
*Assistant Examiner*—Adam C. Rehm
(74) *Attorney, Agent, or Firm*—Kurt Luther; Dennis F. Armijo

(57) ABSTRACT

A dual mode or multimode backlight containing LEDs as a light source. The backlight has light cavity containing a reflective material. The cavity has an opening to allow light to be directed to a display source such as a liquid crystal display (LCD). Two sets of LEDs are provided, one set for day mode and one set for night mode. The night mode LEDs is fitted with an NVIS filter. The day mode LEDs is fitted with a filter that suppresses the phosphorescence from the day mode LEDs. The filter suppress the IR energy and allows maximum luminance from the day mode LEDs. During night mode operation, the backlight is flooded with light. Filtered light from the NVIS LED's would impinge on the day mode LED's causing them to phosphoresce. The filter over the day mode LEDs removes the infrared energy from the phosphorescent light emitted from the day mode LEDs.

12 Claims, 2 Drawing Sheets

DUAL MODE DISPLAY WITH A BACKLIGHT FILTER FOR AN UNACTIVATED LIGHT EMITTING DIODE (LED)

UNITED STATES GOVERNMENT RIGHTS

The United States Government has acquired certain rights in this invention through Government Contract No. N00019-93-C-006 awarded by the Department of the Navy.

BACKGROUND OF THE INVENTION

1. Field of the Invention (Technical Field)

The invention relates to displays and more particularly to dual mode transmissive display backlighting of color displays for use in a night mode such as in conjunction with Night Vision Goggles (NVG).

2. Background Art

A design of a Liquid Crystal Display (LCD) was needed with a backlight with two different modes of operation with different colors for each mode. An additional requirement was that one of the modes, the night mode, be compatible with Night Vision Imaging System (NVIS) requirements of MIL-L-85762A. This mode, NVIS mode, was also required to have a particular color as defined in MIL-L-85762A as NVIS Green A. The other mode of operation, day mode, needed to provide full daylight readability of the display in an avionic high ambient illumination condition, and was required to be white. The backlight illumination source was selected to be white LEDs for both modes of operation. The particular problem, which was encountered with the initial design, was associated with the phosphorescence of the day mode LEDs when they were illuminated with radiant energy from the NVIS filtered night mode LEDs. The day mode LEDs absorbed NVIS compatible illumination and re-radiated non-compliant energy. This phosphorescence caused the display to fail the NVIS requirements of MIL-L-85762A.

A typical dual mode backlight would provide an NVIS filter that acts only in the NVIS mode lighting source, which would not prevent the phosphorescence of the day mode lighting source from creating NVIS problems through phosphorescence. Other day mode lighting sources (incandescent lamps, fluorescent lamps, etc.) do not typically exhibit phosphorescence in the NVIS region of interest (i.e., absorption in visible spectrum, 380–780 nm, and re-emission in the NVIS spectrum, 570–930 nm). Placing a conventional NVIS filter over the day mode lighting source would severely limit the efficiency of the day mode lighting system, which would require the use of more LEDs and more power to achieve day mode requirements of legibility in high ambient illumination conditions.

There are patents for dual-mode backlights/displays, which are NVIS compatible. However, the previous designs use different illumination sources, and do not require the optical filtering techniques required for the present invention. The introduction of white LEDs caused the issue to arise. LEDs were selected for this particular design for several reasons. They have improved reliability relative to other types of lighting sources (i.e., incandescent lamps, fluorescent lamps), and they perform extremely well over a very wide operating temperature which is advantageous for demanding environmental conditions as are typically encountered with avionic or automotive display products. LEDs are also very easy to drive electrically and to dim as is required for backlights in avionic applications. Typically, if a material phosphoresces and causes problems with NVIS radiance, the material is removed from the design or it is placed behind the NVIS filter. Due to the use of the white LEDs for the day mode backlight design, removal is not possible, and filtering with a typical NVIS filter would significantly inhibit meeting the day mode requirements, thereby eliminating one of the natural advantages of a dual mode backlighting system.

There are several prior art devices that disclose dual mode backlighting systems. These include U.S. Pat. No. 5,986,730, for an LCD that is both transmissive and reflective and U.S. Pat. Nos. 6,285,425 and 6,285,426, which involve using a reflector to allow a display to be illuminated from ambient light. Some of the prior art devices that use an NVIS filter for filtering the NVIS light source include U.S. Pat. No. 5,982,090, which discloses a special kind of flat fluorescent lamp used in LCD backlighting and U.S. Pat. No. 6,039,451, which teaches the use of a transflector that is used to enhance day mode luminance. U.S. Pat. No. 6,419,372 is a dual mode LED backlighting system that uses a light guide to distribute the two different LED lighting systems. This system includes NVIS filtering that is only applicable to the night mode LEDs and does not address the issue of phosphorescence, which will result from the NVIS illumination radiating onto the day mode LEDs.

None of the prior art devices teach or imply the use of a filter placed over the inactive or "day mode" light source as presently described in the present application.

SUMMARY OF THE INVENTION
(DISCLOSURE OF THE INVENTION)

In accordance with the present invention, there is provided a dual mode or multimode backlight for a display. The preferred backlight enables two different colors of backlighting for a transmissive monochrome display, using a highly efficient filter to enable daytime viewing with one system while still meeting the stringent NVIS requirements with the other lighting system. This invention enables the use of white or different colored LEDs in an NVIS compatible mode of operation when they are not activated, which is necessary for display backlighting systems and especially for cockpit illumination systems.

A primary object of the present invention is to enable the use of white LEDs for an NVIS compatible display with a dual mode backlighting system.

A primary advantage of the present invention is that it achieves NVIS compliance with one array of white LEDs, while maintaining the ability to meet demanding daytime requirements with another array of white LEDs. This permits the use of white LEDs for this type of application over other lighting sources. LEDs have several advantages including longer life, instant on at cold temperatures, very little change in output illumination over a wide temperature range, simple drive electronics, very wide dimming range, simplified assembly construction, and environmentally friendly manufacturing.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
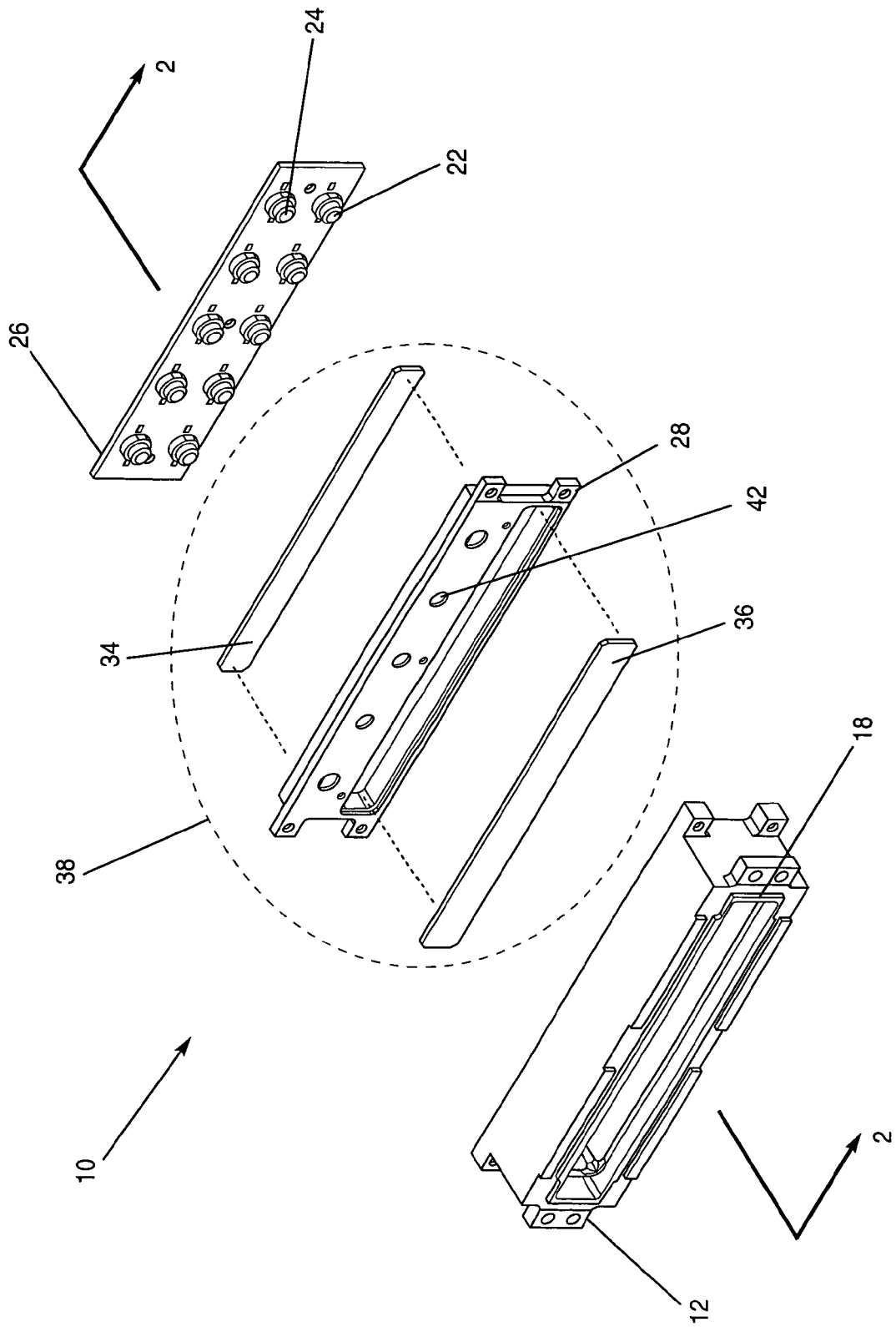
FIG. 1 is an exploded view of the preferred dual mode backlight.
Figure 2:
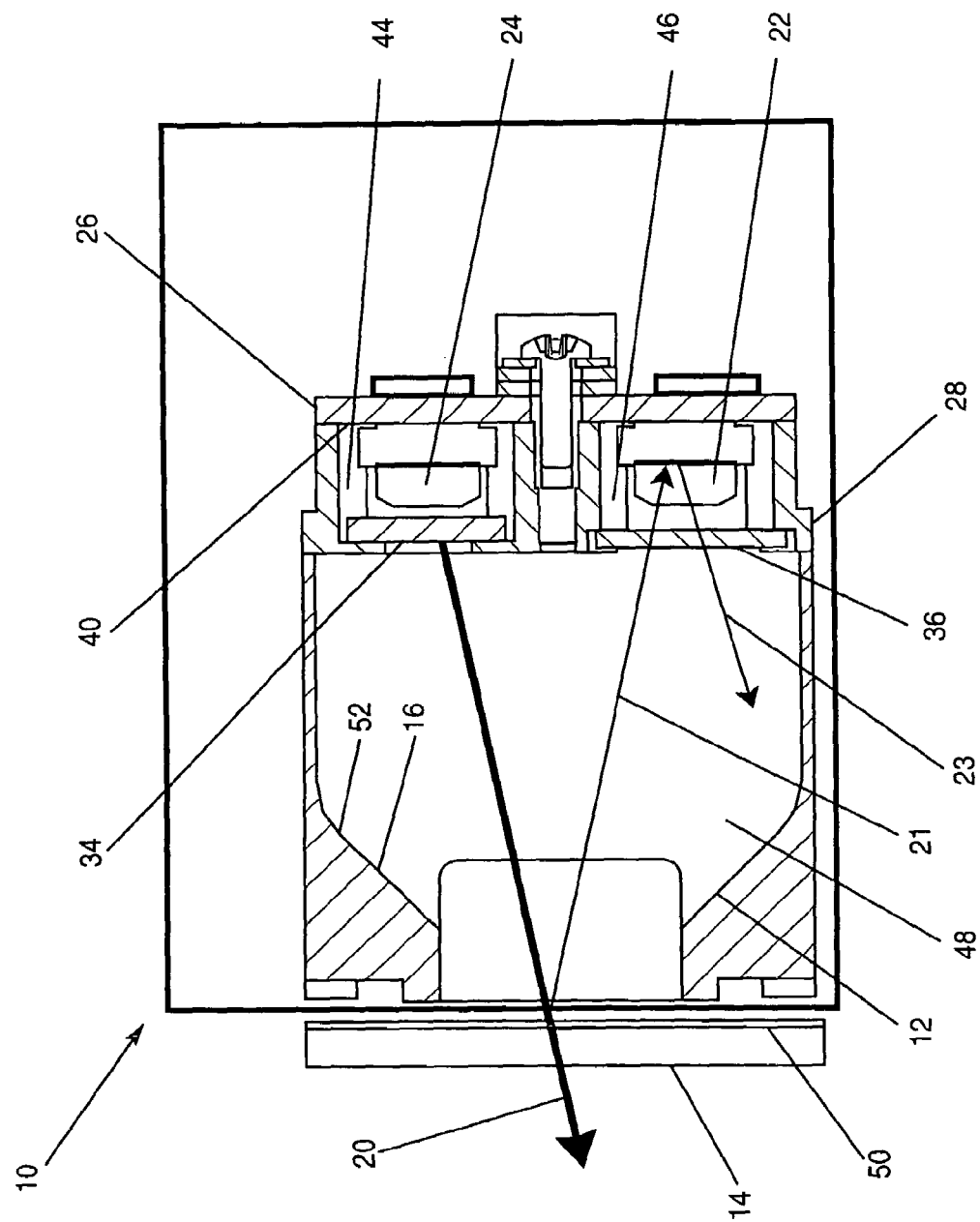
FIG. 2 is a cut out view of the embodiment of FIG. 1.

FIG. 1 shows an exploded view of the preferred backlight and FIG. 2 shows a cut out view of the preferred backlight containing a more detailed view of the particular features of the present invention. Backlight 10 consists of a housing or light cavity 12 for directing light 20 to the display source 14 such as an LCD. As is well known in the art, display source 14, such as a liquid crystal display, is illuminated by the backlight 10. Backlight 10 is preferably fabricated from a material that does not transmit light, such as aluminum or plastic and is preferably coated on the inside with reflective material 16. Reflective material 16 can either be a diffusely reflective material or a specularly reflective material. Backlight 10 is preferably opened on a first end 18 to direct light 20 to a display source 14 such as a LCD.

LEDs 22 and 24 are installed inside the light cavity 12. In the preferred embodiment, light cavity 12 contains three distinct sub cavities. A night mode cavity 44 is formed by NVIS filter 34 and night mode LEDs 24. A day mode cavity 46 is formed by second filter or hot mirror 36 and day mode LEDs 22. A common or primary cavity 48 is formed by a rear of the LCD diffuser 50, cavity walls 52 and the front sides of NVIS filter 34 and hot mirror 36. The preferred light cavity 12 is constructed to minimize the exposed area of the NVIS filter 34, thus making the backlight 10 more efficient. This construction comprises small apertures 42, which allow NVIS filtered light to enter into primary cavity 48 for limiting the exposure of the NVIS filter 34. Apertures 42 can be sized individually to balance or to provide improved uniformity of the backlight illumination. Typically NVIS filters absorb large amounts of light. Therefore, if a face of a NVIS filter is fully exposed to one or more LEDs, and is not limited by designs such as the small apertures 42 as used in the present invention, the amount of light output from the backlight for either the NVIS or day mode LEDs would be significantly reduced. LEDs 22 and 24 may be mounted on a printed wiring board (PWB) 26 or other mounting structure well known in the art. PWB 26 provides interconnect to the LEDs 22 and 24, thereby simplifying the construction of backlight 10. PWB 26 can also serve as the rear surface 40 of the backlight assembly 10, which helps to contain the light generated by the LEDs 22 and 24 and direct the light to the LCD diffuser 50 and subsequently through LCD 14. LCD 14 is located adjacent to the front side of LCD diffuser 50, as shown. The PWB 26 can also serve as a heat sink for the LEDs 22 and 24 to remove heat. Filter housing 28 is fitted over the LEDs 22 and 24 in such a way as to separate the day mode LEDs 22 and night mode LEDs 24 and provide mounting surfaces for a day filter 36 and a night filter 34. Filter housing 28 is preferably constructed from a material that does not transmit light such as metal or plastic. Filter housing 28 with filters 36 and 34 installed separates the day mode 22 and night mode LEDs 24 preventing unfiltered light from being exchanged between them. A filter housing would not be necessary if the filters themselves were designed in such a way as to accomplish the same thing. For example, if the filters were cylindrical in shape and covered the LEDs, the filter housing would not be required. A conventional NVIS filter 34 is installed on the filter housing 28 over the night mode LEDs 24. NVIS filter 34 acts as a filter for the night mode LEDs 24. NVIS filter 34 removes red and near infrared energy from the emitted light and filters for the required emitted color. This filter 34 enables the light passing through the LCD 14 to meet NVIS requirements for radiance and color. A second filter 36, such as a hot mirror, is installed over the day mode LEDs 22. This second filter 36, is selected to filter the phosphorescent light 23 emitted from the day mode LEDs 22 thereby removing sufficient infrared content to enable the system to meet NVIS radiance requirements. In the preferred embodiment a hot mirror is used as the second filter 36.

Although a hot mirror is used in the preferred embodiment, this disclosure is meant to cover all other types of filters such as narrow band reflective notch or narrow band absorptive filters, that are well known in the art. The critical characteristics of second filter 36 are that it must have very high transmission (>80%) in the visible spectrum (approximately 380–650 nm), and have sufficient attenuation (~90%) in the spectral region in which the day mode light source phosphoresces, which is within the NVIS goggle region of sensitivity (570–930 nm). This attenuation can be accomplished through either reflection or absorption but is most effectively accomplished through reflection. The white LEDs have a broad band phosphorescence; consequently, the selected filter needs to attenuate near-infrared energy from approximately 750 nm to at least 930 nm to provide NVIS compatible lighting for night mode. Depending upon the magnitude of phosphorescence and the required level of NVIS performance as defined in MIL-L-85762A, the attenuation can begin at wavelengths further out into the near-infrared region (e.g., 800 nm to 930 nm). The shift in attenuation towards higher wavelengths is advantageous because this minimizes the effect of the filter on the day mode lighting, in particular the color of the day mode lighting is improved by shifting the attenuation characteristic further into the infrared region. If the filter's characteristic shifts as a function of angle as is the case with typical thin film optical coatings due to the difference in optical path length, the attenuation or reflective characteristic of the filter needs to be extended beyond the NVIS spectral region of 930 nm. This is to account for the performance of the filter with light, which is passing through the filter at higher angles of incidence. Consequently, a filter that has sufficient attenuation out to at least 1100 nm is desired for a broad band phosphorescing material. Other materials phosphoresce over a narrow spectral region, which would only require a narrow band filter that attenuated the specific wavelengths at which the phosphorescence occurs. The filter and housing assembly 38 separates the LEDs 22 and 24 in such a way as to prevent exchange of unfiltered light.

With all dual mode backlights using LEDs, light from the night mode LEDs 24 floods the primary backlight cavity 12. Some of the light 21 impinges on the day mode LEDs 22. The energy excites the LEDs phosphor and caused the day mode LEDs 22 to phosphoresce 23. The phosphorescent light has sufficient energy content in the infrared region to cause the system to cause the day mode LEDs 22 to "light up" and degrade the night mode backlight system and thus, fail NVIS radiance. The hot mirror 36 corrects this problem by filtering the phosphorescent light emitted 23 from the day mode LEDs 22, thereby removing sufficient infrared content to enable the system to meet NVIS radiance requirements. Hot mirror 36 has filter characteristics that attenuate the infrared energy emitted from the day mode LEDs 22. It is designed to allow the maximum amount of day mode light to pass through. When the day mode LEDs 22 are operational, hot mirror 36 attenuates a minimal amount of visible light thereby maximizing day mode luminance.

During day mode operation, backlight 10 is turned on by activating the electrical drive of the day mode LEDs 22 and disabling the electrical drive of the night mode LEDs 24. The illumination from the day mode LEDs 22 passes through hot mirror 36 and floods the primary lighting cavity 48 providing rear illumination onto the backlight diffuser 50. A small portion of visible spectrum and a large portion of the near-infrared spectrum of the LED illumination is attenuated by hot mirror 36. When the illumination is incident upon the diffuser 50, some of the illumination passes through it and subsequently through LCD 14 to the display user, the remainder of the illumination scatters backward from the diffuser 50 or off of the reflective 16 sidewalls of the backlight cavity 12. This reflected illumination is conserved through multiple reflections within backlight cavity 12, eventually passing through diffuser 50 to the user or it is lost to absorption in the exposed areas of the NVIS filter 34 covering the NVIS LEDs 24.

During night mode of operation, backlight 10 is turned on by activating the electrical drive of night mode LEDs 24 and disabling the electrical drive of the day mode LEDs 22. The illumination from night mode LEDs 24 passes through NVIS filter 34 and floods primary lighting cavity 48 providing rear illumination onto the backlight diffuser 50. NVIS filter 34 attenuates the red and near-infrared portion of the spectrum to provide a NVIS compliant color of light, such as NVIS green A, and to provide NVIS radiant compliant illumination. When the illumination is incident upon diffuser 50, some of the illumination passes through it and subsequently through LCD 14 to the display user. The remainder of the illumination scatters backward 21 from diffuser 50 or is reflected off of the sidewalls of backlight cavity 12. Some of the illumination within backlight cavity 12 passes through hot mirror 36 and irradiates the day mode LEDs 22. Day mode LEDs 22 phosphoresce converting this NVIS compliant illumination to higher wavelengths which are not compliant to the NVIS requirements. The phosphorescent illumination then passes through hot mirror 36 where the non-compliant near-infrared energy is attenuated to render it NVIS compliant. Some of this filtered phosphorescent illumination passes through diffuser 50 and through LCD 14 to the display user, while the remainder is cycled in a similar manner through multiple reflections or is lost to absorption in the exposed areas of NVIS filter 34.

Although the discussion above describes a dual use backlight, the present invention can be used for a multimode backlight. For instance more than one night mode can be provided in the backlight with different colors representing different conditions. Additionally, more than one day mode can be provided in the backlight with different colors of LEDs for different conditions.

The present invention could be used in an alternative embodiment by using color LEDs for night mode operation. The hot mirror could also be placed over both sets of LEDs (not shown). This variation would be limited in that the color options would be limited by the color of the LED's.

The invention would have commercial application for electronics with displays where the user uses night vision imaging systems. This is becoming increasingly prevalent in law enforcement. Applications for the present invention can include but not limited to avionics displays, ground vehicle instruments or displays and hand-held instruments or displays.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A multimode backlight for a display comprising:
    at least one first illumination source comprising a first mode;
    a first filter adjacent to said at least one first illumination source;
    at least one second illumination source, wherein said first filter comprises an NVIS filter comprising a second mode; and
    a second filter adjacent to said at least one second illumination source for suppressing an excitation of said at least one second illumination source caused by said at least one first illumination source.

2. The invention of claim 1 further comprising apertures for limiting an exposure to said NVIS filter from illumination from said at least one second illumination source.

3. The invention of claim 2 wherein the apertures comprise different sized apertures for a uniform distribution of a light from the at least one first illumination source.

4. The invention of claim 1 wherein said at least one first illumination source comprises at least one light emitting diode comprising a first color and said at least one second illumination source comprise at least one light emitting diode comprising a second color.

5. The invention of claim 1 wherein said second filter comprises a filter for attenuating a first predetermined wavelength and for transmitting a second predetermined wavelength.

6. The invention of claim 5 wherein said second filter for attenuating a first predetermined wavelength comprises attenuating phosphorescent light emitted by the at least one second illumination source.

7. The invention of claim 1 wherein said second filter comprises a hot mirror.

8. The invention of claim 1 wherein said second filter comprises a notch filter.

9. A method of multimode backlighting of a display, the method comprising the steps of:
    a) filtering a first illumination source comprising a first mode with a first filter, wherein the first filter comprises an NVIS filter; and
    b) suppressing an excitation of a second illumination source comprising a second mode caused by said first illumination source with a second filter.

10. The method of claim 9 further comprising the step of limiting an exposure to the NVIS filter from illumination from the second illumination source with limiting apertures.

11. The method of claim 9 wherein the step of suppressing comprises attenuating a first predetermined wavelength and for transmitting a second predetermined wavelength.

12. The method of claim 11 wherein the step of attenuating a first predetermined wavelength comprises attenuating phosphorescent light emitted by the at least one second illumination source.

* * * * *